US009821606B2

(12) United States Patent
Abad et al.

(10) Patent No.: US 9,821,606 B2
(45) Date of Patent: *Nov. 21, 2017

(54) COMPOSITE REINFORCER SHEATHED WITH A LAYER OF POLYMER THAT IS SELF-ADHESIVE TO RUBBER

(75) Inventors: Vincent Abad, Clermont-Ferrand (FR); Sébastien Rigo, Clermont-Ferrand (FR); Emmanuel Custodero, Clermont-Ferrand (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 336 days.

This patent is subject to a terminal disclaimer.

(21) Appl. No.: 13/981,769

(22) PCT Filed: Jan. 31, 2012

(86) PCT No.: PCT/EP2012/051518
§ 371 (c)(1),
(2), (4) Date: Oct. 29, 2013

(87) PCT Pub. No.: WO2012/104281
PCT Pub. Date: Aug. 9, 2012

(65) Prior Publication Data
US 2014/0045983 A1 Feb. 13, 2014

(30) Foreign Application Priority Data

Feb. 3, 2011 (FR) ...................... 11 50858

(51) Int. Cl.
| C08K 9/00 | (2006.01) |
| B60C 9/00 | (2006.01) |
| B29D 30/38 | (2006.01) |
| D02G 3/48 | (2006.01) |
| D07B 1/06 | (2006.01) |

(52) U.S. Cl.
CPC ............ B60C 9/0042 (2013.01); B29D 30/38 (2013.01); D02G 3/48 (2013.01); D07B 1/0666 (2013.01); B29D 2030/383 (2013.01); B60C 2009/0021 (2013.01); D07B 2201/2012 (2013.01); D07B 2201/2044 (2013.01); D07B 2201/2046 (2013.01); D07B 2205/2003 (2013.01); D07B 2205/2082 (2013.01); D07B 2501/2046 (2013.01); Y10T 428/2938 (2015.01); Y10T 428/2967 (2015.01); Y10T 428/2969 (2015.01)

(58) Field of Classification Search
CPC .................................................. C09C 177/02
USPC ........................................................ 524/440
See application file for complete search history.

(56) References Cited

U.S. PATENT DOCUMENTS

| 3,383,340 | A | 5/1968 | MacCallum et al. ............. 260/3 |
| 3,765,998 | A * | 10/1973 | Oswald ................. B29C 31/004 |
| | | | 156/242 |
| 3,915,939 | A | 10/1975 | Wilson ........................... 260/78 |
| 4,173,556 | A | 11/1979 | Coran et al. .................. 260/30.8 |
| 4,424,304 | A | 1/1984 | Hambrecht et al. ............. 525/68 |
| 4,732,928 | A | 3/1988 | Mizushiro et al. ........... 524/505 |
| 4,754,794 | A | 7/1988 | Bocquet et al. .............. 152/527 |
| 4,857,128 | A | 8/1989 | Bocquet et al. ......... 156/244.12 |
| 6,346,325 | B1 | 2/2002 | Edwards ......................... 428/40 |
| 6,766,841 | B2 | 7/2004 | Cordonnier et al. ......... 152/527 |
| 6,815,473 | B2 | 11/2004 | Robert et al. ................. 523/215 |
| 6,903,165 | B2 | 6/2005 | Yabui et al. .................. 525/383 |
| 7,312,264 | B2 | 12/2007 | Gandon-Pain ................ 524/236 |
| 7,553,912 | B2 | 6/2009 | Ikuta et al. ................... 525/343 |
| 7,954,528 | B2 | 6/2011 | Tsou et al. ................... 152/510 |
| 8,066,934 | B2 | 11/2011 | de Paoli et al. .............. 264/469 |
| 8,357,255 | B2 | 1/2013 | Inoue ........................ 156/110.1 |
| 8,563,098 | B2 | 10/2013 | Abad et al. ..................... 428/12 |

(Continued)

FOREIGN PATENT DOCUMENTS

| AU | 602 904 | 11/1990 |
| DE | 28 16 463 A1 | 10/1979 |

(Continued)

OTHER PUBLICATIONS

U.S. Appl. No. 13/981,677, filed Jan. 31, 2012, Vincent Abad.
U.S. Appl. No. 13/981,762, filed Jan. 31, 2012, Vincent Abad.
U.S. Appl. No. 14/358,126, filed Nov. 14, 2012, Pottier.
U.S. Appl. No. 14/358,089, filed Nov. 14, 2012, Custodero.
U.S. Appl. No. 14/365,697, filed Dec. 14, 2012, Custodero.
U.S. Appl. No. 14/376,708, filed Jan. 31, 2013, Abad.
U.S. Appl. No. 14/376,715, filed Jan. 31, 2013, Abad.
Sigma_Aldrich, Poly(2,6-dimethyl-1,4-phenylene oxide), http://www.sigmaaldrich.com/catalog/product/aldrich/181781?lang=eng&region=US, copyright 2015, pp. 1-3.
Wikipedia, Piano Wire. https://en.wikipedia.org/wiki/Piano_wire, copyright Oct. 21, 2015, pp. 1-3.

Primary Examiner — Hannah Pak
(74) Attorney, Agent, or Firm — Fitzpatrick, Cella, Harper & Scinto

(57) ABSTRACT

A composite reinforcer that can adhere directly to a diene rubber matrix is usable as a reinforcing element for a pneumatic tire. The composite reinforcer includes at least one reinforcing thread, such as a carbon steel cord. Covering each thread individually or several threads collectively is a layer of a thermoplastic polymer composition. The thermoplastic polymer composition includes at least one thermoplastic polymer have a glass transition temperature that is positive, a poly(p-phenylene ether) (PPE), and a functionalized unsaturated thermoplastic styrene (TPS) elastomer having a glass transition temperature that is negative. The TPS elastomer includes a functional group selected from: an epoxide group, a carboxyl group, an acid anhydride group, and an ester group. A process for manufacturing such a composite reinforcer is presented, as well as a process for producing a rubber article, especially a pneumatic tire, incorporating such a composite reinforcer.

13 Claims, 3 Drawing Sheets

(56) References Cited

U.S. PATENT DOCUMENTS

| | | | |
|---|---|---|---|
| 8,658,898 B2 | 2/2014 | Horiuchi | 174/110 R |
| 8,763,662 B2 * | 7/2014 | Abad et al. | 152/451 |
| 8,785,543 B2 * | 7/2014 | Abad et al. | 524/502 |
| 9,540,766 B2 | 1/2017 | Abad et al. | D07B 1/0633 |
| 2001/0039308 A1 | 11/2001 | Custodero et al. | 524/430 |
| 2002/0053386 A1 | 5/2002 | Hirachi et al. | 152/529 |
| 2002/0183436 A1 | 12/2002 | Robert et al. | 524/492 |
| 2003/0075253 A1 | 4/2003 | Serra et al. | 152/525 |
| 2003/0120007 A1 | 6/2003 | Bortolotti et al. | 526/232 |
| 2003/0150541 A1 | 8/2003 | Herbelleau et al. | 152/540 |
| 2003/0166772 A1 | 9/2003 | Ajbani et al. | 525/66 |
| 2003/0232915 A1 | 12/2003 | Corvasce et al. | 524/502 |
| 2004/0019144 A1 | 1/2004 | Bortolotti et al. | 524/492 |
| 2004/0261928 A1 | 12/2004 | Imhoff et al. | 152/565 |
| 2005/0004413 A1 | 1/2005 | Kanauchi et al. | 585/810 |
| 2005/0043466 A1 | 2/2005 | Kishimoto | |
| 2006/0089445 A1 | 4/2006 | Gandon-Pain | 524/492 |
| 2006/0174536 A1 * | 8/2006 | Nakanishi | 43/44.98 |
| 2007/0066740 A1 | 3/2007 | Odle et al. | 524/430 |
| 2008/0026244 A1 | 1/2008 | Barbotin et al. | 428/625 |
| 2008/0206449 A1 | 8/2008 | Klei et al. | 427/117 |
| 2008/0255310 A1 | 10/2008 | Tsou et al. | 525/178 |
| 2008/0306215 A1 * | 12/2008 | Patil et al. | 525/132 |
| 2009/0065117 A1 | 3/2009 | Caprio et al. | 152/450 |
| 2009/0093584 A1 | 4/2009 | Gelles et al. | 524/505 |
| 2009/0234047 A1 | 9/2009 | De Paoli et al. | 524/35 |
| 2010/0122845 A1 * | 5/2010 | Guo et al. | 174/72 A |
| 2010/0168306 A1 | 7/2010 | Barbotin et al. | 524/327 |
| 2011/0206552 A1 | 8/2011 | Shimizu | 420/99 |
| 2011/0315425 A1 | 12/2011 | Horiuchi | 174/110 SR |
| 2012/0053268 A1 | 3/2012 | De Paoli et al. | 524/9 |
| 2012/0125506 A1 | 5/2012 | Custodero et al. | 152/451 |
| 2012/0128972 A1 | 5/2012 | Custodero et al. | 428/339 |
| 2012/0149822 A1 | 6/2012 | Abad et al. | 524/449 |
| 2012/0156400 A1 | 6/2012 | Abad et al. | 428/12 |
| 2012/0180921 A1 | 7/2012 | Abad et al. | 152/450 |
| 2012/0267023 A1 | 10/2012 | Abad et al. | 152/451 |
| 2012/0285597 A1 | 11/2012 | Abad et al. | 152/450 |
| 2013/0096230 A1 | 4/2013 | Abad et al. | 523/351 |
| 2013/0116376 A1 | 5/2013 | Custodero et al. | 524/526 |
| 2013/0196086 A1 | 8/2013 | Abad et al. | 428/12 |
| 2013/0273366 A1 | 10/2013 | Abad et al. | 428/378 |
| 2014/0044964 A1 | 2/2014 | Abad et al. | 428/378 |
| 2014/0051312 A1 | 2/2014 | Abad et al. | 442/149 |
| 2014/0090548 A1 | 4/2014 | Abad | 87/6 |
| 2014/0290204 A1 | 10/2014 | Custodero et al. | 57/7 |
| 2014/0305558 A1 | 10/2014 | Abad et al. | 152/209.1 |
| 2014/0311120 A1 | 10/2014 | Pottier et al. | 57/232 |
| 2015/0004413 A1 | 1/2015 | Abad et al. | 428/378 |
| 2015/0030851 A1 * | 1/2015 | Abad | D07B 1/0666 428/378 |

FOREIGN PATENT DOCUMENTS

| | | |
|---|---|---|
| EP | 0 189 749 A1 | 8/1986 |
| EP | 0 763 564 A2 | 3/1997 |
| EP | 0 902 046 A1 | 3/1999 |
| EP | 0 962 562 A1 | 12/1999 |
| EP | 1 371 680 A1 | 12/2003 |
| EP | 1 403 287 A1 | 3/2004 |
| EP | 1 870 908 A1 | 12/2007 |
| EP | 2 070 952 A1 | 6/2009 |
| FR | 2 576 247 A1 | 7/1986 |
| FR | 2 601 293 A1 | 1/1988 |
| FR | 2 945 826 A1 | 11/2010 |
| FR | 2 952 076 A1 | 5/2011 |
| JP | 9-227760 A | 9/1997 |
| JP | 2002-201577 A | 7/2002 |
| JP | 2002-205511 A | 7/2002 |
| JP | 2004-211261 A | 7/2004 |
| JP | 2009-301777 A | 12/2009 |
| WO | 93/14252 A1 | 7/1993 |
| WO | 00/24840 A1 | 5/2000 |
| WO | 01/92402 A1 | 12/2001 |
| WO | 03/066353 A1 | 8/2003 |
| WO | 2004/096865 A2 | 11/2004 |
| WO | 2005/047025 A1 | 5/2005 |
| WO | 2005-113666 A1 | 12/2005 |
| WO | 2007/008632 A2 | 1/2007 |
| WO | 2007/137378 A2 | 12/2007 |
| WO | 2010-105975 A1 | 9/2010 |
| WO | 2010/119871 A1 | 10/2010 |
| WO | 2010-136389 A1 | 12/2010 |
| WO | 2011/012521 A1 | 2/2011 |
| WO | 2011/051204 A1 | 5/2011 |

* cited by examiner

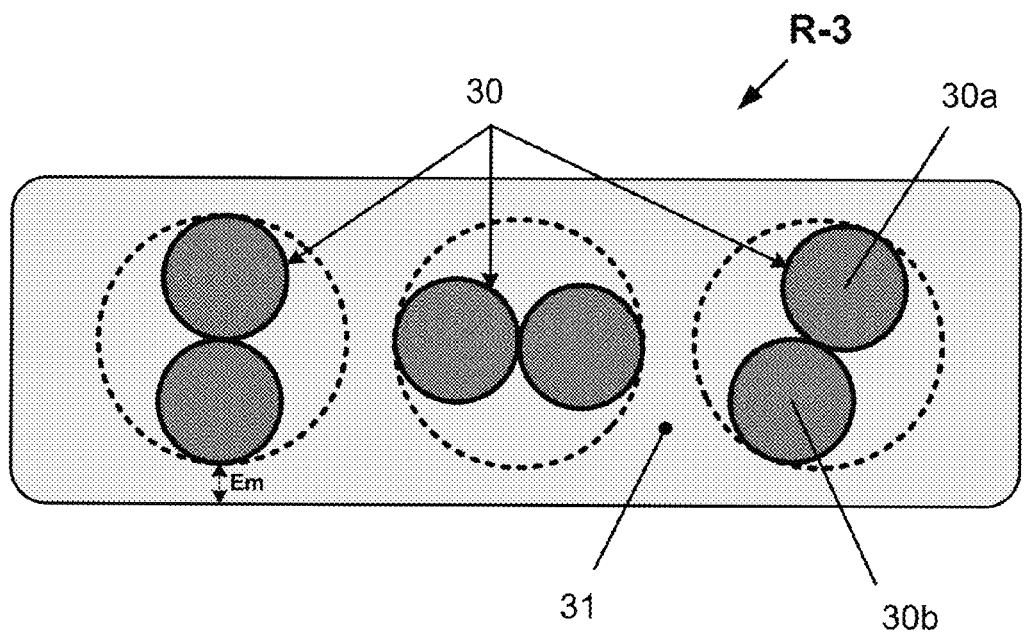
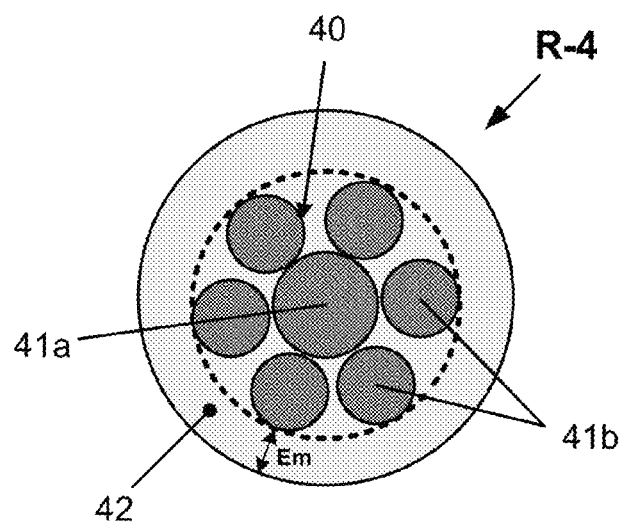

COMPOSITE REINFORCER SHEATHED WITH A LAYER OF POLYMER THAT IS SELF-ADHESIVE TO RUBBER

FIELD OF THE INVENTION

The field of the present invention is that of reinforcing elements or "reinforcers", notably metal ones, which can be used to reinforce diene rubber articles or semi-finished products such as, for example, pneumatic tyres.

The present invention relates more particularly to reinforcers of the hybrid or composite type that consist of at least one core, in particular a metal core, said core being covered or sheathed by a layer or sheath of thermoplastic material.

STATE OF THE ART

The sheathing of metallic reinforcers with thermoplastic materials, such as for example a polyamide or polyester, has been known for a very long time, especially so as to protect these reinforcers from various types of external attack such as oxidation or abrasion, or else for the purpose of structurally stiffening, by bonding them together, various groups of threads or thread assemblies such as cords, and thus increasing particularly their buckling resistance.

Such composite reinforcers, together with their use in rubber articles such as pneumatic tyres, have been described in many patent documents.

Patent application EP 0 962 562 has for example described a reinforcer, made of steel or aramid textile, sheathed by a thermoplastic material such as a polyester or polyamide, for the purpose of improving its abrasion resistance.

Patent application FR 2 601 293 has described the sheathing of a metal cord with a polyamide so as to use it as a bead wire in a pneumatic tyre bead, this sheathing advantageously enabling the shape of this bead wire to adapt to the structure and to the operating conditions of the bead of the pneumatic tyre that it reinforces.

Patent documents FR 2 576 247 and U.S. Pat. No. 4,754,794 have also described metal cords or threads that can be used as a bead wire in a pneumatic tyre bead, these threads or cords being doubly-sheathed or even triply-sheathed by two or respectively three different thermoplastic materials (e.g. polyamides) having different melting temperatures, with the purpose, on the one hand, of controlling the distance between these threads or cords and, on the other hand, of eliminating the risk of wear by rubbing or of corrosion, in order to use them as a bead wire in a pneumatic tyre bead.

These reinforcers thus sheathed with a polyester or polyamide material have, apart from the aforementioned advantages of corrosion resistance, abrasion resistance and structural rigidity, the not insignificant advantage of being able to be subsequently bonded to diene rubber matrices using simple textile adhesives called RFL (resorcinol-formaldehyde-latex) adhesives comprising at least one diene elastomer, such as natural rubber, which adhesives are known to provide satisfactory adhesion between textile fibres, such as polyester or polyamide fibres, and a diene rubber.

Thus, it may be advantageous to use metal reinforcers not coated with adhesive metal layers, such as with brass, and also surrounding rubber matrices containing no metal salts, such as cobalt salts, which are necessary as is known for maintaining the adhesive properties over the course of time but which significantly increase, on the one hand, the cost of the rubber matrices themselves and, on the other hand, their oxidation and ageing sensitivity (see for example patent application WO 2005/113666).

However, the above RFL adhesives are not without drawbacks: in particular they contain as base substance formaldehyde (or methanal) and also resorcinol which it is desirable long-term to eliminate from adhesive compositions because of the recent changes in European regulations regarding products of this type.

Thus, designers of diene rubber articles, especially pneumatic tyre manufacturers, are presently seeking new adhesive systems or new reinforcers that enable all or some of the aforementioned drawbacks to be alleviated.

Patent applications WO 2010/105975 and WO 2010/136389, recently published, disclose composite reinforcers, in particular having a metal core, of the self-adhesive type which meet the above objective.

These composite reinforcers, having levels of adhesion to the rubber which easily compete with those achieved with conventional RFL adhesives, have however the drawback that their manufacturing process goes through two successive sheathing or covering steps, firstly requiring the deposition of a first layer of thermoplastic polymer such as polyamide, then the deposition of a second layer of unsaturated thermoplastic elastomer, the two depositions, carried out at different temperatures, also being separated by intermediate steps of cooling with water (for solidification of the first layer) and drying.

These successive handlings are somewhat detrimental from an industrial viewpoint and antinomic to seeking high production rates.

BRIEF DESCRIPTION OF THE INVENTION

On continuing their research, the applicant companies discovered a novel composite reinforcer of self-adhesive type which it too makes it possible to achieve excellent adhesion levels compared to the use of RFL adhesives, while offering a simplified manufacturing process, compared to the processes described in the aforementioned patent applications WO 2010/105975 and WO 2010/136389, since it requires only a single sheathing operation.

As a consequence, a first subject of the invention is a composite reinforcer comprising:
one or more reinforcing thread(s);
covering said thread, individually each thread or collectively several threads, a layer of a thermoplastic polymer composition comprising at least one thermoplastic polymer, the glass transition temperature of which is positive, a poly(p-phenylene ether) (PPE) and a functionalized unsaturated thermoplastic styrene (TPS) elastomer, the glass transition temperature of which is negative, said TPS elastomer bearing functional groups selected from epoxide, carboxyl and acid anhydride or ester groups.

It was unexpectedly observed that the presence of this specific thermoplastic polymer composition made it possible to ensure a direct and high-performance adhesion of the composite reinforcer of the invention to a diene elastomer matrix or composition, such as those commonly used in pneumatic tyres, in particular at high temperature.

The invention also relates to a process for manufacturing the above composite reinforcer, said process being characterized in that individually the reinforcing thread or each reinforcing thread, or collectively several reinforcing threads, is/are sheathed with a layer of thermoplastic polymer composition comprising a thermoplastic polymer, the glass transition temperature of which is positive, a poly(p- phenylene ether) (PPE) and a functionalized unsaturated thermoplastic styrene (TPS) elastomer, the glass transition temperature of which is negative, said TPS elastomer bearing functional groups selected from epoxide, carboxyl and acid anhydride or ester groups.

The present invention also relates to the use of the composite reinforcer of the invention as a reinforcing element for rubber articles or semi-finished products, particularly pneumatic tyres, especially those intended to be fitted onto motor vehicles of the passenger type, SUVs ("Sport Utility Vehicles"), two-wheel vehicles (especially bicycles and motorcycles), aircraft, or industrial vehicles chosen from vans, "heavy" vehicles, i.e. underground trains, buses, heavy road transport vehicles (lorries, tractors, trailers), off-road vehicles, such as agricultural or civil engineering machines, and other transport or handling vehicles.

The invention also relates per se to any rubber article or semi-finished product, in particular a pneumatic tyre, that includes a composite reinforcer according to the invention.

BRIEF DESCRIPTION OF THE DRAWINGS

The invention and its advantages will be readily understood in the light of the description and the embodiments that follow, in conjunction with the figures relating to these embodiments which show schematically:

FIG. 3—in cross section, another example of a reinforcer in accordance with the invention;

FIG. 4—in cross section, another example of a reinforcer in accordance with the invention;

DETAILED DESCRIPTION OF THE INVENTION

Figure 1:
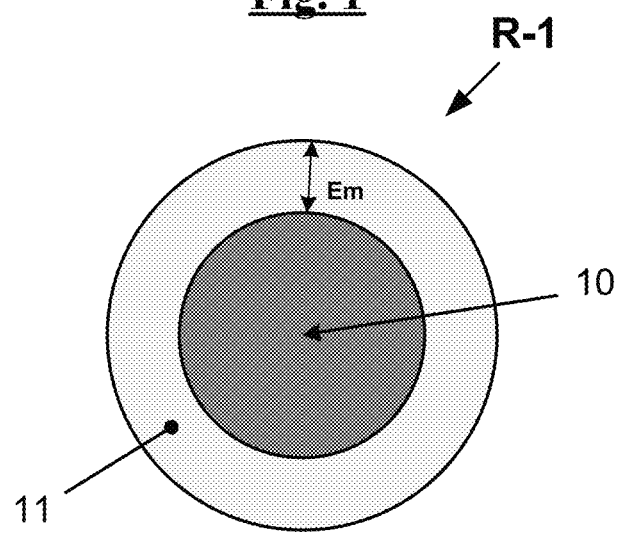
FIG. 1—in cross section, an example of a composite reinforcer according to the invention.

In the present description, unless expressly indicated otherwise, all the percentages (%) shown are percentages by weight.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The composite reinforcer of the invention, capable of adhering directly, by curing, to an unsaturated rubber composition and able to be used in particular for reinforcing diene rubber articles, such as pneumatic tyres, therefore has the essential features of comprising:
  at least one reinforcing thread (i.e. one or more reinforcing threads);
  covering individually said thread, each thread or collectively several threads, a layer of a thermoplastic polymer composition comprising a thermoplastic polymer, the glass transition temperature (denoted hereafter by $Tg_1$) of which is positive (i.e. above 0° C.), a poly(p-phenylene ether) (PPE) and a functionalized unsaturated thermoplastic styrene (TPS) elastomer, the glass transition temperature of which is negative, said TPS elastomer bearing functional groups selected from epoxide, carboxyl and acid anhydride or ester groups.

In other words, the composite reinforcer of the invention comprises a single reinforcing thread or several reinforcing threads, said thread, individually each thread or collectively several threads being covered by a layer (monolayer) or sheath of the above-mentioned thermoplastic polymer composition. The structure of the reinforcer of the invention is described in detail below.

In the present application, the term "reinforcing thread" is generally understood to mean any elongate element of great length relative to its cross section, whatever the shape, for example circular, oblong, rectangular, square, or even flat, of this cross section, it being possible for this thread to be straight or not straight, for example twisted or wavy.

This reinforcing thread may take any known form. For example, it may be an individual monofilament of large diameter (for example and preferably equal to or greater than 50 µm), an individual ribbon, a multifilament fibre (consisting of a plurality of individual filaments of small diameter, typically less than 30 µm), a textile folded yarn formed from several fibres twisted together, a textile or metal cord formed from several fibres or monofilaments cabled or twisted together, or else an assembly, group or row of threads such as for example a band or strip comprising several of these monofilaments, fibres, folded yarns or cords grouped together, for example aligned along a main direction, whether straight or not.

The or each reinforcing thread has a diameter which is preferably smaller than 5 mm, especially in the range from 0.1 to 2 mm.

Preferably, the reinforcing thread is a metal reinforcing thread, especially a carbon steel wire such as those used in steel cords for tyres. However, it is of course possible to use other types of steel, for example stainless steel. When a carbon steel is used, its carbon content is preferably between 0.4% and 1.2%, especially between 0.5% and 1.1%. The invention applies in particular to any steel of the steel cord type having a standard or NT ("Normal Tensile") strength, a high or HT ("High Tensile") strength, a very high or SHT ("Super High Tensile") strength or an ultra-high or UHT ("Ultra High Tensile") strength.

The steel could be coated with an adhesive layer, such as a layer of brass or zinc. However, advantageously a bright, i.e. uncoated, steel may be used. Furthermore, by virtue of the invention, the rubber composition intended to be reinforced by a metal reinforcer according to the invention no longer requires the use in its formulation of metal salts such as cobalt salts.

The thermoplastic polymer composition constituting the layer or sheath above firstly comprises a thermoplastic polymer having by definition a positive Tg (denoted by $Tg_1$), preferably above +20° C. and more preferably above +30° C. Moreover, the melting temperature (denoted by Tm) of this thermoplastic polymer is preferably above 100° C., more preferably above 150° C. and especially above 200° C.

This thermoplastic polymer is preferably selected from the group consisting of polyamides, polyesters and polyimides, more particularly from the group consisting of aliphatic polyamides and polyesters. Among the polyesters, mention may be made, for example, of PET (polyethylene terephthalate), PEN (polyethylene naphthalate), PBT (polybutylene terephthalate), PBN (polybutylene naphthalate), PPT (polypropylene terephthalate) and PPN (polypropylene naphthalate). Among the aliphatic polyamides, mention may especially be made of the polyamides PA-4,6, PA-6, PA-6,6, PA-11 or PA-12. This thermoplastic polymer is preferably an aliphatic polyamide, more preferably a polyamide 6 or a polyamide 11.

The second essential constituent of the thermoplastic polymer composition is a functionalized unsaturated thermoplastic styrene elastomer, said elastomer bearing epoxide, carboxyl and acid anhydride or ester groups or functions.

Preferably, the functional groups are epoxide groups, i.e. the thermoplastic elastomer is an epoxidized elastomer.

The Tg ($Tg_2$ or first Tg or lowest Tg) of said elastomer is by definition negative, preferably below −20° C. and more preferably below −30° C. Thus, and according to a preferred embodiment of the invention, the difference in glass transition temperatures ($Tg_1$−$Tg_2$) between the thermoplastic polymer and the unsaturated TPS elastomer is greater than 40° C. and more preferably greater than 60° C.

It will be recalled here that TPS (thermoplastic styrene) elastomers are thermoplastic elastomers in the form of styrene-based block copolymers. These thermoplastic elastomers, having an intermediate structure between thermoplastic polymers and elastomers, are made up, as is known, from polystyrene hard sequences linked by elastomer soft sequences, for example polybutadiene, polyisoprene or poly(ethylene/butylene) sequences.

This is why, as is known, TPS copolymers are generally characterized by the presence of two glass transition peaks, the first (lowest, negative temperature, corresponding to $Tg_2$) peak relating to the elastomer sequence of the TPS copolymer and the second (highest, positive temperature, typically at around 80° C. or more) peak relating to the thermoplastic part (styrene blocks) of the TPS copolymer.

These TPS elastomers are often triblock elastomers with two hard segments linked by a soft segment. The hard and soft segments may be arranged in a linear fashion, or in a star or branched configuration. These TPS elastomers may also be diblock elastomers with a single hard segment linked to a soft segment. Typically, each of these segments or blocks contains a minimum of more than 5, generally more than 10, base units (for example styrene units and isoprene units in the case of a styrene/isoprene/styrene block copolymer). Of course, in that respect they must not be confused with statistical diene copolymer elastomers such as, for example, SIR rubbers (styrene-isoprene copolymers) or SBR rubbers (styrene-butadiene copolymers) which, as is well known, do not have any thermoplastic character.

As a reminder, an essential feature of the TPS elastomer used in the composite reinforcer of the invention is the fact that it is unsaturated. The expression "unsaturated TPS elastomer" is understood by definition, and as is well known, to mean a TPS elastomer that contains ethylenically unsaturated groups, i.e. it contains carbon-carbon double bonds (whether conjugated or not). Conversely, a saturated TPS elastomer is of course a TPS elastomer that contains no such double bonds.

A second essential feature of the TPS elastomer used in the composite reinforcer of the invention is that it is functionalized, bearing functional groups selected from epoxide, carboxyl and acid anhydride or ester groups or functions. According to one particularly preferred embodiment, this TPS elastomer is an epoxidized elastomer, that is to say one bearing one or more epoxide groups.

Preferably, the unsaturated elastomer is a copolymer comprising, as base units, styrene (i.e. polystyrene) blocks and diene (i.e. polydiene) blocks, especially isoprene (polyisoprene) or butadiene (polybutadiene) blocks. Such an elastomer is selected in particular from the group consisting of styrene/butadiene (SB), styrene/isoprene (SI), styrene/butadiene/butylene (SBB), styrene/butadiene/isoprene (SBI), styrene/butadiene/styrene (SBS), styrene/butadiene/butylene/styrene (SBBS), styrene/isoprene/styrene (SIS), styrene/butadiene/isoprene/styrene (SBIS) block copolymers and blends of these copolymers.

More preferably, this unsaturated elastomer is a copolymer of the triblock type, selected from the group consisting of styrene/butadiene/styrene (SBS), styrene/butadiene/butylene/styrene (SBBS), styrene/isoprene/styrene (SIS), styrene/butadiene/isoprene/styrene (SBIS) block copolymers and blends of these copolymers; more particularly, it is an SBS or SIS, especially an SBS.

According to another preferred embodiment of the invention, the styrene content in the unsaturated TPS elastomer is between 5% and 50%. Outside the range indicated, there is a risk of the intended technical effect, namely an adhesion compromise with respect, on the one hand, to the layer of the thermoplastic polymer and, on the other hand, to the diene elastomer to which the reinforcer is moreover intended, no longer being optimal. For these reasons, the styrene content is more preferably between 10% and 40%.

The number-average molecular weight (denoted by Mn) of the TPS elastomer is preferably between 5000 and 500 000 g/mol, more preferably between 7000 and 450 000.

Epoxidized unsaturated TPS elastomers, such as for example SBS, are known and commercially available, for example from the company Daicel under the name "Epofriend".

The thermoplastic polymer composition has another essential feature of comprising, in combination with the thermoplastic polymer and the functionalized unsaturated TPS elastomer described above, at least one poly(p-phenylene ether) (or poly(1,4-phenylene ether)) polymer (denoted by the abbreviation "PPE").

PPE thermoplastic polymers are well known to a person skilled in the art, they are resins that are solid at ambient temperature (20° C.). Preferably, the PPE used here has a glass transition temperature (denoted hereafter by $Tg_3$) which is greater than 150° C., more preferably greater than 180° C. As regards its number-average molecular weight (Mn), it is preferably between 5000 and 100 000 g/mol.

As non-limiting examples of PPE polymers that can be used in the composite reinforcer of the invention, mention may especially be made of those selected from the group consisting of poly(2,6-dimethyl-1,4-phenylene ether), poly(2,6-dimethyl-co-2,3,6-trimethyl-1,4-phenylene ether), poly-(2,3,6-trimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly-(2,6-dipropyl-1,4-phenylene ether), poly(2-ethyl-6-propyl-1,4-phenylene ether), poly(2,6-dilauryl-1,4-phenylene ether), poly(2,6-diphenyl-1,4-phenylene ether), poly(2,6-dimethoxy-1,4-phenylene ether), poly(1,6-diethoxy-1,4-phenylene ether), poly(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenyl-1,4-phenylene ether), poly(2-ethoxy-1,4-phenylene ether), poly(2-chloro-1,4-phenylene ether), poly(2,6-dibromo-1,4-phenylene ether), poly(3-bromo-2,6-dimethyl-1,4-phenylene ether), their respective copolymers and blends of these homopolymers or copolymers.

According to one particular and preferred embodiment, the PPE used is poly(2,6-dimethyl-1,4-phenylene ether) also sometimes known as polyphenylene oxide (or PPO for short). Such commercially available PPE or PPO polymers are for example the PPE called "Xyron S202" from the company Asahi Kasei or the PPE called "Noryl SA120" from the company Sabic.

Preferably, in the thermoplastic polymer composition of the composite reinforcer of the invention, the amount of PPE polymer is adjusted in such a way that the weight content of PPE is between 0.05 and 5 times, more preferably between 0.1 and 2 times, the weight content of styrene present in the functionalized TPS elastomer itself. Below the recommended minima, the adhesion of the composite reinforcer to the rubber may be reduced, whereas above the indicated maxima, there is a risk of embrittling the layer.

For all these reasons, the weight content of PPE is more preferably still between 0.2 and 1.5 times the weight content of styrene in the TPS elastomer.

The Tg of the above thermoplastic polymers ($Tg_1$, $Tg_2$ and $Tg_3$) is measured, in a known manner, by DSC (Differential Scanning calorimetry), for example and unless specifically indicated otherwise in the present application, according to the ASTM D3418 standard of 1999.

The number-average molecular weight (Mn) is determined, in a known manner, by size exclusion chromatography (SEC). The sample is firstly dissolved in tetrahydrofuran at a concentration of about 1 g/l and then the solution is filtered through a filter with a porosity of 0.45 μm before injection. The apparatus used is a WATERS Alliance chromatograph. The elution solvent is tetrahydrofuran, the flow rate is 0.7 ml/min, the temperature of the system is 35° C. and the analytical time is 90 min. A set of four Waters columns in series, with the "Styragel" tradenames ("HMW7", "HMW6E" and two "HT6E"), is used. The injected volume of the solution of the polymer sample is 100 μl. The detector is a WATERS 2410 differential refractometer and its associated software, for handling the chromatograph data, is the WATERS MILLENIUM system. The calculated average molecular weights are relative to a calibration curve obtained with polystyrene standards.

Although the three constituents described above (thermoplastic polymer, unsaturated TPS elastomer and PPE) are sufficient by themselves to give the composite reinforcer of the invention very high properties of adhesion to an unsaturated rubber such as natural rubber, certain conventional additives such as colourant, filler, plasticizer, tackifier, antioxidant or other stabilizer, crosslinking or vulcanization system such as sulphur and accelerator, could optionally be added to the thermoplastic polymer composition described previously.

FIG. 1 appended hereto shows very schematically (without being drawn to a specific scale), in cross section, a first example of a composite reinforcer according to the invention. This composite reinforcer denoted by R-1 consists of a reinforcing thread (10) consisting of a unitary filament or monofilament having a relatively large diameter (for example between 0.10 and 0.50 mm), for example made of carbon steel, which is covered with a layer (11) comprising a thermoplastic polymer having a positive Tg ($Tg_1$), for example made of polyamide or polyester, a PPE such as PPO and a functionalized unsaturated TPS elastomer, for example an SB, SBS, SBBS, SIS or SBIS of epoxidized type, having a negative Tg ($Tg_2$); the minimum thickness of this layer is denoted by $E_m$ in this FIG. 1.

Figure 2:
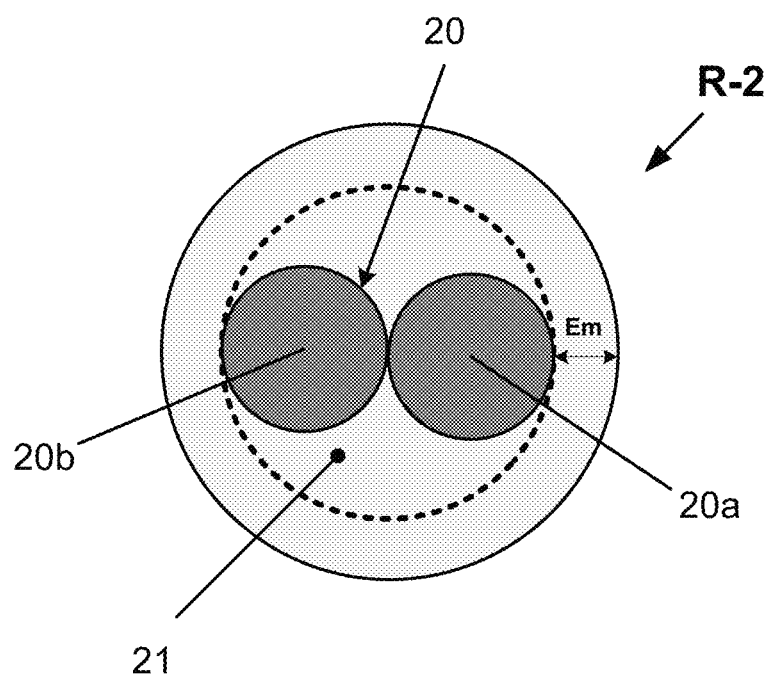
FIG. 2—in cross section, another example of a reinforcer in accordance with the invention.

FIG. 2 shows schematically, in cross section, a second example of a composite reinforcer according to the invention. This composite reinforcer denoted by R-2 consists of a reinforcing thread (20) consisting in fact of two unitary filaments or monofilaments (20a, 20b) of relatively large diameter (for example between 0.10 and 0.50 mm) twisted or cabled together, for example made of carbon steel. The reinforcing thread (20) is covered with a layer (21), with a minimum thickness $E_m$, comprising a thermoplastic polymer having a positive Tg ($Tg_1$), for example made of polyamide or polyester, a PPE such as PPO and a functionalized unsaturated TPS elastomer, for example an epoxidized SBS or SIS for example an SB, SBS, SBBS, SIS or SBIS, having a negative Tg ($Tg_2$).

FIG. 3 shows schematically, in cross section, another example of a composite reinforcer according to the invention. This composite reinforcer denoted by R-3 consists of three reinforcing threads (30) each consisting of two monofilaments (30a, 30b) of relatively large diameter (for example between 0.10 and 0.50 mm) twisted or cabled together, for example made of carbon steel. The assembly formed by the three for example aligned reinforcing threads (30) is covered with a layer (31) comprising a thermoplastic polymer having a positive Tg ($Tg_1$), for example made of polyamide or polyester, a PPE such as PPO and a functionalized unsaturated TPS elastomer, for example an SB, SBS, SBBS, SIS or SBIS of epoxidized type, having a negative Tg ($Tg_2$).

FIG. 4 shows schematically, again in cross section, another example of a composite reinforcer according to the invention. This composite reinforcer R-4 comprises a reinforcing thread (40) consisting of a steel cord of 1+6 construction, with a central wire or core wire (41a) and six filaments (41b) of the same diameter that are wound together in a helix around the central wire. This reinforcing thread or cord (40) is covered with a layer (42) of a polymer composition comprising a polyamide, a PPE such as PPO and a functionalized, for example epoxidized, SBS elastomer.

In the composite reinforcers according to the invention, such as those shown schematically for example in the aforementioned FIGS. 1 to 4, the minimum thickness $E_m$ of the sheath surrounding the reinforcing thread or threads may vary very widely depending on the particular production conditions of the invention. It is preferably between 1 μm and 2 mm, more preferably between 10 μm and 1 mm.

If several reinforcing threads (especially several cords) are used, the coating layer or sheath may be deposited individually on each of the reinforcing threads (especially on each of the cords) (as a reminder, these reinforcing threads may or may not be unitary), as illustrated for example in FIGS. 1, 2 and 4 commented upon above, or may also be deposited collectively on several reinforcing threads (especially on several cords) appropriately arranged, for example aligned along a main direction, as illustrated for example in FIG. 3.

The composite reinforcer of the invention is prepared by a specific process comprising at least the step according to which at least one (i.e. one or more) reinforcing thread is subjected to a sheathing operation, preferably by passing through an extrusion head, for sheathing with the layer of thermoplastic polymer composition described above comprising the thermoplastic polymer having a positive Tg ($Tg_1$), the functionalized unsaturated thermoplastic styrene elastomer having a negative Tg ($Tg_2$) and the PPE having a Tg ($Tg_3$) that is preferably greater than 150° C.

The sheathing step above is carried out, in a manner known to those skilled in the art, continuously in line. For example, it simply consists in making the reinforcing thread pass through dies of suitable diameter in an extrusion head heated to an appropriate temperature.

According to a preferred embodiment, the reinforcing thread or threads are preheated, for example by induction heating or by IR radiation, before passing into the extrusion head. On exiting the extrusion head, the reinforcing thread or threads thus sheathed are then cooled sufficiently for the polymer layer to solidify, for example using air or another cold gas, or by the thread(s) passing through a water bath followed by a drying step.

The composite reinforcer in accordance with the invention that is thus obtained may optionally undergo a heat treatment, directly after extrusion or subsequently after cooling.

As an example, in order to obtain a sheathed reinforcing thread having a total diameter of about 1 mm, a reinforcing thread with a diameter of about 0.6 mm, for example a metal cord consisting simply of two individual monofilaments of 0.3 mm diameter twisted together (as for example illustrated in FIG. 2) is covered with a layer of a composition of polyamide, of functionalized TPS elastomer and of PPE, having a maximum thickness equal to about 0.4 mm, on an extrusion/sheathing line comprising two dies, a first die (counter-die or upstream die) having a diameter equal to about 0.65 mm and a second die (or downstream die) having a diameter equal to about 0.95 mm, both dies being placed in an extrusion head heated to about 230° C. The mixture of polyamide, functionalized TPS and PPE, which melts at a temperature of 210° C. in the extruder, thus covers the cord on passing through the sheathing head, at a thread run speed typically equal to several tens of m/min for an extrusion pump rate typically of several tens of g/min. The mixing of the polyamide, functionalized TPS and PPE may be carried out in situ, in the extrusion head itself, the three components then being introduced for example via three different feed hoppers; according to another possible exemplary embodiment, the polyamide, TPS and PPE may also be used in the form of a previously manufactured mixture, for example in the form of granules, a single feed hopper then being sufficient. On exiting this sheathing die, the cord may be immersed in a tank filled with cold water for cooling before the take-up reel is passed into an oven for drying.

For the sheathing step described above, the cord (reinforcing thread) is advantageously preheated, for example by passing through an HF generator or through a heating tunnel, before passing into the extrusion head.

After this sheathing operation, i.e. directly on leaving the sheathing head, the composite reinforcer may, for example, pass through a tunnel oven, for example several meters in length, in order to undergo therein a heat treatment in air. This treatment temperature is for example between 150° C. and 300° C., for treatment times of a few seconds to a few minutes depending on the case (for example between 10 s and 10 min), it being understood that the duration of the treatment will be shorter the higher the temperature and that the heat treatment necessarily must not lead to the thermoplastic materials used remelting or even excessively softening. The composite reinforcer of the invention thus completed is advantageously cooled, for example in air, so as to avoid undesirable sticking problems while it is being wound onto the final take-up reel.

Where appropriate, a person skilled in the art will know how to adjust the temperature and the duration of the optional heat treatment above according to the particular operating conditions of the invention, especially according to the exact nature of the composite reinforcer manufactured, in particular according to whether the treatment is on monofilaments taken individually, cords consisting of several monofilaments or groups of such monofilaments or cords, such as strips. In particular, a person skilled in the art will have the advantage of varying the treatment temperature and treatment time so as to find, by successive approximations, the operating conditions giving the best adhesion results for each particular embodiment of the invention.

The steps of the process of the invention that have been described above may advantageously be supplemented with a final treatment for three-dimensionally crosslinking the reinforcer, in order to further increase the intrinsic cohesion of its sheath, especially if this composite reinforcer is intended for being eventually used at a relatively high temperature, typically above 100° C.

This crosslinking may be carried out by any known means, for example by physical crosslinking means such as ion or electron bombardment, or by chemical crosslinking means, for example by incorporating a crosslinking agent (for example linseed oil) into the thermoplastic polymer composition, for example while it is being extruded, or else by incorporating a vulcanization system (i.e. a sulphur-based crosslinking system) into this composition.

Crosslinking may also take place during the curing of the pneumatic tyres (or more generally rubber articles) that the composite reinforcer of the invention is intended to reinforce, by means of the intrinsic crosslinking system present in the diene rubber compositions used for making such tyres (or articles) and coming into contact with the composite reinforcer of the invention.

The composite reinforcer of the invention can be used directly, that is to say without requiring any additional adhesive system, as reinforcing element for a diene rubber matrix, for example in a pneumatic tyre. Advantageously, it may be used to reinforce pneumatic tyres for all types of vehicle, in particular for passenger vehicles or industrial vehicles such as heavy vehicles.

Figure 5:
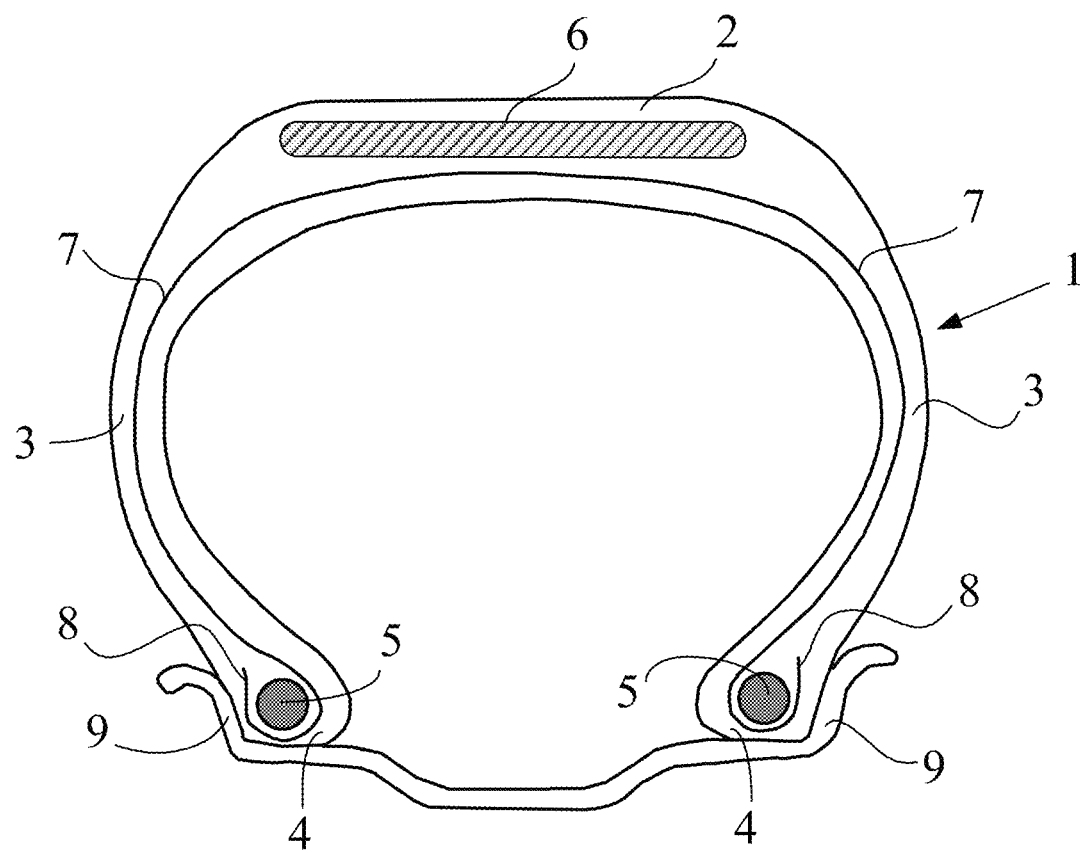
FIG. 5—in radial section, a pneumatic tyre having a radial carcass reinforcement, in accordance with the invention, incorporating a composite reinforcer according to the invention.

As an example, FIG. 5 appended hereto shows very schematically (without being drawn to a specific scale) a radial section through a pneumatic tyre according to the invention for a passenger vehicle.

This pneumatic tyre 1 comprises a crown 2 reinforced by a crown reinforcement or belt 6, two sidewalls 3 and two beads 4, each of these beads 4 being reinforced with a bead wire 5. The crown 2 is surmounted by a tread, not shown in this schematic figure. A carcass reinforcement 7 is wound around the two bead wires 5 in each bead 4, the upturn 8 of this reinforcement 7 lying for example towards the outside of the tyre 1, which here is shown fitted onto its rim 9. The carcass reinforcement 7 is, in a manner known per se, constituted of at least one ply reinforced with "radial", for example textile or metal, cords, that is to say that these cords are positioned practically parallel to one another and extend from one bead to the other so as to form an angle of between 80° and 90° with the median circumferential plane (plane perpendicular to the axis of rotation of the tyre which is located halfway between the two beads 4 and passes through the middle of the crown reinforcement 6).

This pneumatic tyre 1 of the invention has for example the essential feature that at least one of the crown or carcass reinforcements thereof comprises a composite reinforcer according to the invention. According to another possible embodiment example of the invention, it is, for example, the bead wires 5 that could be made from a composite reinforcer according to the invention.

Exemplary Embodiments of the Invention

Trial 1—Composite Reinforcer Manufacture

Composite reinforcers according to the invention were firstly manufactured in the following manner. The starting reinforcing thread was a steel cord for pneumatic tyres (made of standard steel having a carbon content of 0.7% by weight), of 1×2 construction consisting of two individual threads or monofilaments 0.30 mm in diameter twisted together with a helix pitch of 10 mm. Cord diameter was 0.6 mm.

This cord was covered with a mixture, on the one hand, of polyamide 6 ("Ultramid B33" from the company BASF; Tm equal to about 230° C.) and, on the other hand, of epoxidized SBS ("Epofriend AT501 from the company Daicel) and PPE ("Xyron 5202" from the company Asahi Kasei), on an extrusion/sheathing line by passing it through an extrusion head heated to a temperature of 230° C. and comprising two dies, an upstream die 0.63 mm in diameter and a downstream die 0.92 mm in diameter. The thermoplastic mixture consisting of the polyamide 6 (pump rate of about 42 g/min), epoxidized SBS (pump rate of about 12.6 g/min) and PPE (pump rate of about 5.4 g/min) (according to polyamide/epoxidized SBS/PPE weight ratios of 79/21/9) was heated to a temperature of 230° C. and thus covered the thread (preheated to about 174° C. by passing it through an HF generator) running at a speed of 60 m/min. On leaving the sheathing head, the composite reinforcer obtained was continuously immersed in a cooling tank filled with water at 5° C., in order to cool its thermoplastic sheath, and then dried using an air nozzle.

The glass transition temperatures $Tg_1$, $Tg_2$ and $Tg_3$ of the three types of polymers used above are respectively equal to around +45° C., −95° C. and +215° C. (for example, measured according to the following procedure: 822-2 DSC instrument from Mettler Toledo; a helium atmosphere; samples preheated from ambient temperature (20° C.) to 100° C. (20° C./min) and then rapidly cooled down to −140° C., before finally recording the DSC curve from −140° C. to +300° C. at 20° C./min).

After this sheathing operation, in these examples, the assembly underwent a heat treatment for a time of about 100 s, by passing it through a tunnel oven at 3 m/min in an ambient atmosphere (air), heated to a temperature of 270° C. This resulted in composite reinforcers according to the invention (the reinforcers R-2 as shown schematically in FIG. 2), consisting of the initial steel cord sheathed with its layer of thermoplastic polymer (polyamide 6, PPE and epoxidized SBS elastomer) composition, the adhesive properties of which are optimal.

To determine the best operating conditions for the heat treatment in the above trial, a range of temperatures from 160° C. to 280° C., for four treatment times (50 s, 100 s, 200 s and 400 s), was examined beforehand.

Trial 2—Adhesion Tests

The quality of the bond between the rubber and the composite reinforcers manufactured above was then assessed by a test in which the force needed to extract the reinforcers from a vulcanized rubber composition, also called a vulcanizate, was measured. This rubber composition was a conventional composition used for the calendering of metal tyre belt plies, based on natural rubber, carbon black and standard additives.

The vulcanizate was a rubber block consisting of two sheets measuring 200 mm by 4.5 mm and with a thickness of 3.5 mm, applied against each other before curing (the thickness of the resulting block was then 7 mm). It was during the production of this block that the composite reinforcers (15 strands in total) were imprisoned between the two rubber sheets in the uncured state, an equal distance apart and with one end of each composite reinforcer projecting on either side of these sheets an amount sufficient for the subsequent tensile test. The block containing the reinforcers was then placed in a suitable mould and then cured under pressure. The curing temperature and the curing time, left to the discretion of a person skilled in the art, were adapted to the intended test conditions. For example, in the present case, the block was cured at 160° C. for 15 minutes under a pressure of 16 bar.

After being cured, the specimen, thus consisting of the vulcanized block and the 15 reinforcers, was placed between the jaws of a suitable tensile testing machine so as to pull each reinforcer individually out of the rubber, at a given pull rate and a given temperature (for example, in the present case, at 50 mm/min and 100° C. respectively). The adhesion levels were characterized by measuring the pull-out force (denoted by $F_{max}$) for pulling the reinforcers out of the specimen (this being an average over 15 tensile tests).

It was found that the composite reinforcer of the invention, despite the fact that it contains no RFL adhesive (or any other adhesive), had a particularly high and unexpected pull-out force $F_{max}$, since it was equal to practically 3 times (more precisely, increased by 170%) the reference pull-out force measured on a control composite reinforcer sheathed simply with polyamide 6 and bonded using a conventional RFL adhesive.

Under the same conditions, a control composite reinforcer sheathed simply with polyamide 6 (without TPS elastomer or PPE) but containing no RFL adhesive (or any other adhesive), showed no adhesion to the rubber (practically zero pull-out force).

In conclusion, the composite reinforcer of the invention, owing to its self-adhesive character, constitutes a particularly useful alternative, on account of the very high adhesion levels obtained, in particular at high temperature (100° C. or more), to the composite reinforcers of the prior art that are sheathed with a thermoplastic material such as a polyamide or polyester which require, as is known, the use of an RFL adhesive to ensure that they subsequently adhere to the rubber.

The invention claimed is:

1. A composite reinforcer comprising:
at least one reinforcing thread; and
a layer of a thermoplastic polymer composition covering each thread individually or plural threads collectively, of the at least one reinforcing thread, wherein the thermoplastic polymer composition includes:
a thermoplastic polymer having a glass transition temperature that is positive,
a poly(p-phenylene ether), and
a functionalized unsaturated thermoplastic styrene elastomer having a glass transition temperature that is negative,
wherein the thermoplastic polymer is selected from the group consisting of polyamides, polyesters, and polyimides, and
wherein the functionalized unsaturated thermoplastic styrene elastomer includes a functional group selected from the group consisting of an epoxide group, a carboxyl group, an acid anhydride group, and an ester group.

2. The composite reinforcer according to claim 1, wherein the glass transition temperature of the thermoplastic polymer is above +20° C.

3. The composite reinforcer according to claim 1, wherein the glass transition temperature of the functionalized unsaturated thermoplastic styrene elastomer is below −20° C.

4. The composite reinforcer according to claim 2, wherein the glass transition temperature of the functionalized unsaturated thermoplastic styrene elastomer is below −20° C.

5. The composite reinforcer according to claim 1, wherein a difference between the glass transition temperature of the thermoplastic polymer and the glass transition temperature of the functionalized unsaturated thermoplastic styrene elastomer is greater than 60° C.

6. The composite reinforcer according to claim 1, wherein the thermoplastic polymer is an aliphatic polyamide or a polyester.

7. The composite reinforcer according to claim 1, wherein the functionalized unsaturated thermoplastic styrene elastomer is a copolymer that includes styrene blocks and diene blocks.

8. The composite reinforcer according to claim 1, wherein the poly(p-phenylene ether) has a glass transition temperature above 150° C.

9. The composite reinforcer according to claim 1, wherein the poly(p-phenylene ether) is poly(2,6-dimethyl-1,4-phenylene ether).

10. The composite reinforcer according to claim 1, wherein the functionalized unsaturated thermoplastic styrene elastomer includes between 5% and 50% styrene by weight.

11. The composite reinforcer according to claim 1, wherein a minimum thickness of the layer is between 1 μm and 2 mm.

12. The composite reinforcer according to claim 1, wherein the composite reinforcer is incorporated in a pneumatic tyre.

13. A method for manufacturing a composite reinforcer, comprising steps of:
  providing at least one reinforcing thread;
  providing a thermoplastic polymer composition that includes:
    a thermoplastic polymer having a glass transition temperature that is positive,
    a poly(p-phenylene ether), and
    a functionalized unsaturated thermoplastic styrene elastomer having a glass transition temperature that is negative,
    wherein the thermoplastic polymer is selected from the group consisting of polyamides, polyesters, and polyimides, and
    wherein the functionalized unsaturated thermoplastic styrene elastomer includes a functional group selected from the group consisting of an epoxide group, a carboxyl group, an acid anhydride group, and an ester group; and
  sheathing the at least one reinforcing thread with a layer of the thermoplastic polymer composition, wherein the sheathing covers each thread individually or plural threads collectively.

* * * * *